K. V. RUDIN
FULL STROKE MECHANISM FOR CALCULATING MACHINES.
APPLICATION FILED SEPT. 16, 1920.
1,424,183. Patented Aug. 1, 1922.
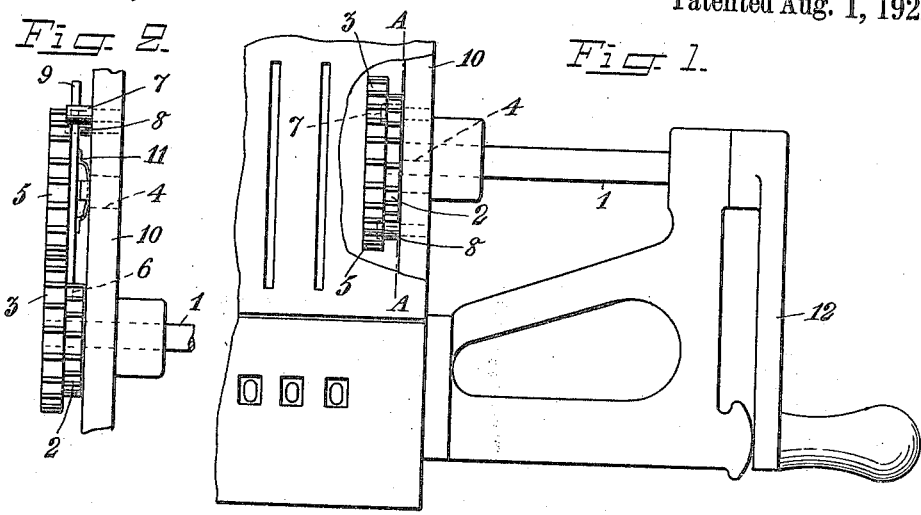
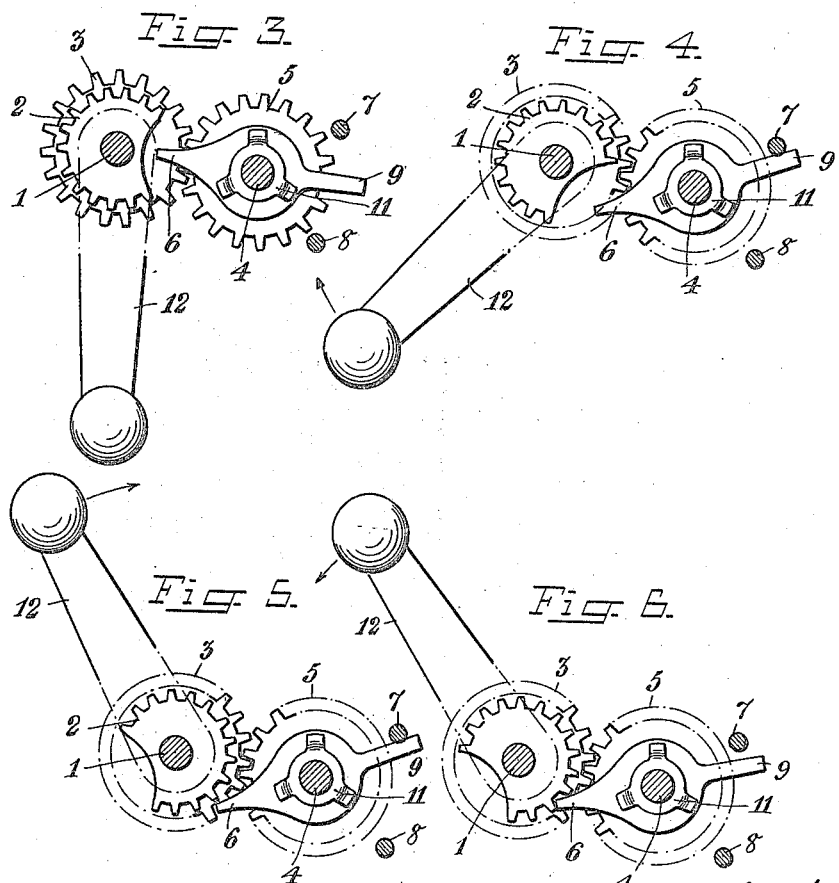

UNITED STATES PATENT OFFICE.

KARL VIKTOR RUDIN, OF STOCKHOLM, SWEDEN.

FULL-STROKE MECHANISM FOR CALCULATING MACHINES.

1,424,183.  Specification of Letters Patent.  Patented Aug. 1, 1922.

Application filed September 16, 1920. Serial No. 410,638.

*To all whom it may concern:*

Be it known that I, KARL VIKTOR RUDIN, subject of the King of Sweden, residing at 12 Karduansmakaregatan, Stockholm, Sweden, have invented certain new and useful Improvements in Full-Stroke Mechanisms for Calculating Machines (for which I filed an application in Sweden September 6, 1919, No. 4,161/19), of which the following is a specification.

The present invention relates to computing and similar machines which are provided with reverse locks, that is, such locks where a return rotation of the crank during a certain portion of its rotation is prevented by a movable lock which upon reversing of the crank automatically enters into engagement with a locking element provided on the crank shaft or another element which absolutely participates in the movement of the crank. During the free movement of the crank the lock retracts on the teeth of the locking element and causes thereby a clicking disagreeable noise. In order to avoid the same the lock in the idle position of the crank, as well as during the normal rotation of the same, is continuously out of engagement with the locking element but enters into locking engagement therewith upon reverse of the rotation of the crank. In order to employ the invention to locking devices in which the element is so arranged that it may coact with a locking arm pivoted on the frame, it is proposed to provide immediately next to the locking element a second circular disk which in connection with an abutment on the locking arm maintains the locking arm during a normal rotation out of contact with the locking element but enters into locking position as soon as the direction of rotation of the crank, after starting of a computing operation is reversed. It has been found that in this reversing of the rotation of the crank the abutment of the locking arm has a tendency to clamp with the disk coacting with the abutment, the crank has to be reversely rotated when it is to be released from the locking position and to be continued in the forward rotation.

In order to avoid this disadvantage in accordance with the present invention, a disc is arranged next to the locking element, which disc is continuously in engagement with another disc disposed near the locking arm, for instance, thereby that both discs are formed as gears and that the locking arm and the appertaining disc are pivotally inter-connected and so arranged that the locking arm participates in the rotary movement of the appertaining disc only by friction and is brought into and out of engagement with the locking disc. The oscillating movement of the locking arm from the locking position is limited by a stationary obstacle overcoming the friction whereby the locking arm in the free position is out of engagement with the teeth of the locking element.

The drawing illustrates an embodiment of the invention. In said drawing:—

Fig. 1 shows the right end of a computing machine provided with a reverse lock, the top plate opposite the locking mechanism having been removed.

Fig. 2 shows to an enlarged scale in top view the locking mechanism.

Figs. 3 to 6 show in section on the line A—A in Fig. 1 the locking mechanism in different positions.

On the shaft 1 of the crank a locking disc 2 and a gear 3 are arranged which are in mesh with a gear 5, fast on a rotary shaft 4. On the shaft 4, furthermore, a locking element 6 is rotatably mounted which is provided for cooperation with a locking disc 2 and whose rotary movement is limited by two stationary abutments 7, 8 which are arranged in the path of the arm 9, protruding from the locking element 6. The locking element 6 is forced against the gear 5 by means of a resilient disc 11 arranged between the element 6 and the side wall 10 of the machine and arranged on the shaft 4. The element is therefore carried along by the rotation of the disc.

The operation is as follows:—

In the idle position of the crank 12, Fig. 3, the point of the element 6 cooperating with the locking disc 2 is in a cutout portion of the disc 2. From this initial position the crank 12 may be rotated in both directions, for instance, in the direction shown by the arrows in Figs. 4 and 5, the gear 5 of course rotating in opposite direction. In view of the friction between the gears 5 and the lock 6, the latter is carried along until the arm 9 engages the abutment 7, Fig. 4, and then the friction between the gear 5 and the locking element is overcome. The element remains during sliding of the gear on the same in this position until the direction of rotation is changed. In the position illustrated by Fig. 4, the cutout portion has not completely left the point of the element 6 so that a return rotation of the crank 12 is still possible in which the gear 5, whose direction of rotation is simultaneously reversed, would carry along the element 6 until the arm 9 engages the abutment 8. In Fig. 5 it is assumed that the direction of rotation indicated in Fig. 4 is maintained. The cutout portion in the edge of the disc 2 has completely passed the point of the element 6 and the teeth of the disc 2 are out of engagement with the element 6 as long as the crank is rotated in the same direction. Upon reversal of the direction of rotation the gear 5 carries along the locking arm 6 until the arm enters into engagement with the teeth of the disc 2, Fig. 6, and the movement of the crank is prevented without a clamping effect which prevents the release of the element upon rotation of the crank in opposite direction. If, therefore, the started direction of rotation shown in Figs. 4 and 5 is continued the element 6 pivots back rearwardly until the arm 9 engages the abutment 7. Upon a rotary movement in the opposite direction the abutment 8 would serve as a lock for the element 6.

As is established from the above description, the locking element is maintained out of engagement with the locking disc as long as the normal direction of rotation is retained and a reverse direction can only be executed either before the passing of the points of the element in front of the disc 2 or after a complete revolution of the crank, counting from the idle position. The cutout portion is so diminished that the crank may still be turned back until the parts necessary for completing the computing operation are not anymore in activity, that is, during the first quarter of revolution of the crank.

What I claim is:—

1. In combination with the crank shaft of a calculating machine of the Trinks type, a reverse lock comprising a toothed disc having a segmental notch, said disc being arranged for rotation with said shaft, a spur gear revoluble with said disc; a shaft mounted for rotation, a second gear fast on said last named shaft and engaged with the first named spur gear, a locking element loosely mounted on said last-named shaft and arranged to engage the teeth of said disc, yieldable means to cause said locking element to turn by frictional contact with said second gear, and means to limit the extent of the turning movement of said locking element.

2. In combination with the crank shaft of a calculating machine of the Trinks type, a reverse lock comprising a toothed disc having a segmental notch, said disc being arranged for rotation with said shaft, a spur gear revoluble with said disc; a shaft mounted for rotation, a second gear fast on said last named shaft and engaged with the first named spur gear, a locking element loosely mounted on said last named shaft and arranged to engage the teeth of said disc, fixed stops to limit the extent of the turning movement of said locking element and between which the arm of said element operates, yieldable means to cause said locking element to turn by frictional contact with said second gear, said locking element having an arm, and means to limit the extent of the turning movement of said locking element.

In testimony whereof I affix my signature in presence of two witnesses.

KARL VIKTOR RUDIN.

Witnesses:
 FRITZ E. HANEY,
 LINNIA NESLIN.